US008996868B2

(12) United States Patent
Lee et al.

(10) Patent No.: US 8,996,868 B2
(45) Date of Patent: Mar. 31, 2015

(54) METHOD OF AUTHENTICATING VEHICLE COMMUNICATION

(75) Inventors: Jeong-Woo Lee, Daejeon (KR); Shin Kyung Lee, Daejeon (KR); Oh Cheon Kwon, Suwon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 255 days.

(21) Appl. No.: 13/323,086

(22) Filed: Dec. 12, 2011

(65) Prior Publication Data

US 2012/0159170 A1    Jun. 21, 2012

(30) Foreign Application Priority Data

Dec. 15, 2010  (KR) .................. 10-2010-0128564
Mar. 16, 2011  (KR) .................. 10-2011-0023472

(51) Int. Cl.
*H04L 9/32*       (2006.01)
*H04W 12/06*   (2009.01)
*H04W 12/02*   (2009.01)

(52) U.S. Cl.
CPC .............. *H04W 12/06* (2013.01); *H04W 12/02* (2013.01)

USPC .......................................................... 713/168

(58) Field of Classification Search
None
See application file for complete search history.

(56) References Cited

U.S. PATENT DOCUMENTS

2009/0287922 A1*  11/2009  Herwono et al. ............. 713/155
2011/0144844 A1*  6/2011   Ishibashi ....................... 701/22

FOREIGN PATENT DOCUMENTS

KR     10-0796525     1/2008
KR     10-0921940     10/2009

* cited by examiner

*Primary Examiner* — David Le
(74) *Attorney, Agent, or Firm* — Staas & Halsey LLP

(57) ABSTRACT

A vehicle communication authentication system performs mutual authentication with an authentication subject by performing a user subscriber identify module (USIM)-based authentication protocol in a wireless network, mounts a USIM card in which mutual authentication is succeeded in a vehicle terminal, and performs authentication of vehicle communication with a server that provides a vehicle service.

10 Claims, 4 Drawing Sheets

METHOD OF AUTHENTICATING VEHICLE COMMUNICATION

CROSS-REFERENCE TO RELATED APPLICATION

This application claims priority to and the benefit of Korean Patent Application Nos. 10-2010-0128564 and 10-2011-0023472 filed in the Korean Intellectual Property Office on Dec. 15, 2010 and Mar. 16, 2011, the entire contents of which are incorporated herein by reference.

BACKGROUND OF THE INVENTION (a) Field of the Invention

The present invention relates to a method of authenticating vehicle communication. More particularly, the present invention relates to an authentication method between an on board equipment that performs vehicle communication with a road side equipment and a server that provides a vehicle service.

(b) Description of the Related Art

Communication technology for vehicles, such as dedicated short range communication (DSRC) and wireless access for vehicular environment (WAVE) allows a road side equipment and an on board equipment to transmit and receive various information through short range wireless communication.

When using communication technology for vehicles, in order to safely protect personal information and in order to safely provide various services using communication technology for vehicles, technology that authenticates whether a user is a right user is necessary. However, a standard of security or authentication of DSRC or WAVE is insufficient.

SUMMARY OF THE INVENTION

The present invention has been made in an effort to provide a method of authenticating vehicle communication having advantages of providing a safe service through vehicle communication.

An exemplary embodiment of the present invention provides a method of performing authentication in an on board equipment that performs vehicle communication with a road side equipment. The method includes inserting a user subscriber identify module (USIM) card that succeeds in mutual authentication with an authentication subject into a card slot; generating, when requesting a vehicle service, authentication information using session keys that are generated in the mutual authentication and transmitting the authentication information to a vehicle service server that provides the vehicle service through the road side equipment; and receiving, when the vehicle service server determines success of verification of authentication information in which the on board equipment transmits, encrypted data from the road side equipment.

Another embodiment of the present invention provides a method in which a server that provides a vehicle service authenticates an on board equipment that performs vehicle communication with a road side equipment. The method includes receiving a vehicle service request comprising authentication information from the on board equipment that inserts a USIM card that succeeds in mutual authentication with an authentication subject into a card slot; and verifying the on board equipment by transmitting authentication information to the authentication subject.

DETAILED DESCRIPTION OF THE EMBODIMENTS

Figure 1:
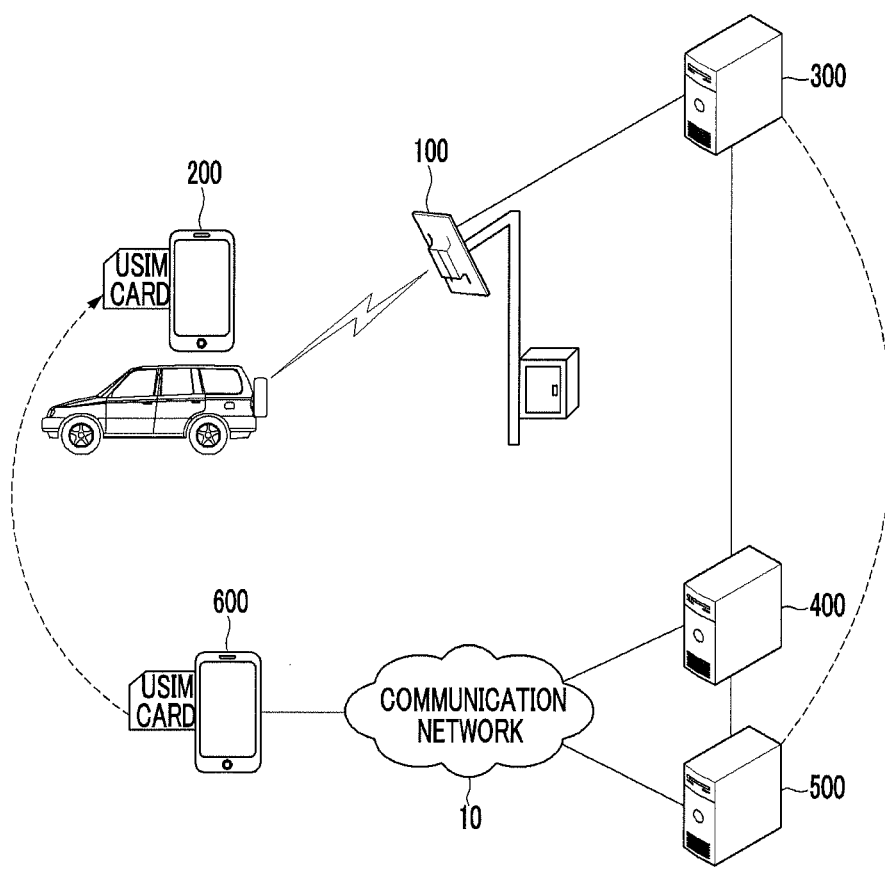
FIG. 1 is a diagram illustrating a vehicle communication authentication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising", will be understood to imply the inclusion of stated elements but not the exclusion of any other elements.

Hereinafter, a method of authenticating vehicle communication according to an exemplary embodiment of the present invention will be described in detail with reference to the drawings.

FIG. 1 is a diagram illustrating a vehicle communication authentication system according to an exemplary embodiment of the present invention.

Referring to FIG. 1, the vehicle communication authentication system includes a road side equipment (RSE) 100, an on board equipment (OBE) 200, a vehicle service server 300, an authentication authorization/accounting (AAA) server 400, a home location register and authentication center (HLR/AUC) 500, and a user terminal 600.

The OBE 200 is a terminal that is mounted in a vehicle and has a communication module (not shown) for performing vehicle communication with the RSE 100 at a wireless segment.

The RSE 100 has a communication module for performing vehicle communication with the OBE 200 at a wireless segment and provides a vehicle service from the vehicle service server 300 to the OBE 200 through vehicle communication with the OBE 200.

Further, the RSE 100 and the OBE 200 transmit/receive various information through vehicle communication. For example, the OBE 200 collects driving information of a vehicle and information of peripheral vehicles and transmits the driving information of a vehicle and the information of peripheral vehicles to the RSE 100 through vehicle communication, and the RSE 100 transmits information that receives from the OBE 200 to the vehicle service server 300 or another server.

In a communication module for vehicle communication, communication technology such as dedicated short range communication (DSRC) or wireless access for vehicular environment (WAVE) can be used.

The vehicle service server 300 is connected to the RSE 100 and performs a function of providing a vehicle service to the OBE 200 through the RSE 100.

According to an exemplary embodiment of the present invention, in order to safely provide a vehicle service to the OBE 200, the OBE 200 and the vehicle service server 300 perform authentication. Authentication in such vehicle communication is performed through interlock with a wireless network 10.

For authentication of vehicle communication, the OBE 200 uses a USIM as an authentication means of the user terminal 600 in the wireless network 10. Therefore, the OBE 200 has a card slot (not shown) that can mount a USIM card therein.

In the USIM card, information to be used for authentication of vehicle communication and information to be used for mutual authentication in the wireless network 10 is previously stored. Vehicle user information representing a vehicle user like a vehicle identifier may be included in information to be used for authentication of vehicle communication, and a secret key may be included in information to be used for mutual authentication in the wireless network 10.

Further, the AAA server 400 and the HLR/AUC 500 stores information that is previously stored at the USIM card for authentication.

For authentication of vehicle communication, the USIM card is first mounted in the user terminal 600 using wireless communication in the wireless network 10 to perform mutual authentication with the AAA server 400 or the HLR/AUC 500 in the wireless network 10. In this case, for mutual authentication in the wireless network 10, authentication and key agreement (AKA) or extensible authentication protocol-AKA can be used. When the wireless network 10 is a wide band code division multiple access (WCDMA) network, an AKA authentication protocol can be used as an authentication protocol, and an authentication subject of this time may be the HLR/AUC 500. Further, when the wireless network 10 is a wireless local area network (WLAN), an EAP-AKA authentication protocol can be used as an authentication protocol, and an authentication subject of this time may be the AAA server 400.

When mutual authentication is succeeded in the wireless network 10, the USIM card and the AAA server 400 or the HLR/AUC 500 store a session key that is generated in mutual authentication.

Thereafter, the USIM card is inserted into a card slot of the OBE 200 to perform authentication of vehicle communication with the vehicle service server 300. The vehicle service server 300 authenticates the user terminal 600 using the AAA server 400 or the HLR/AUC 500. A session key that is stored at the USIM card can be used for encrypting and decrypting data using vehicle communication. Further, the session key that is stored at the AAA server 400 or the HLR/AUC 500 is transmitted to the RSE 100 to be used for encrypting and decrypting data using vehicle communication.

Figure 2:
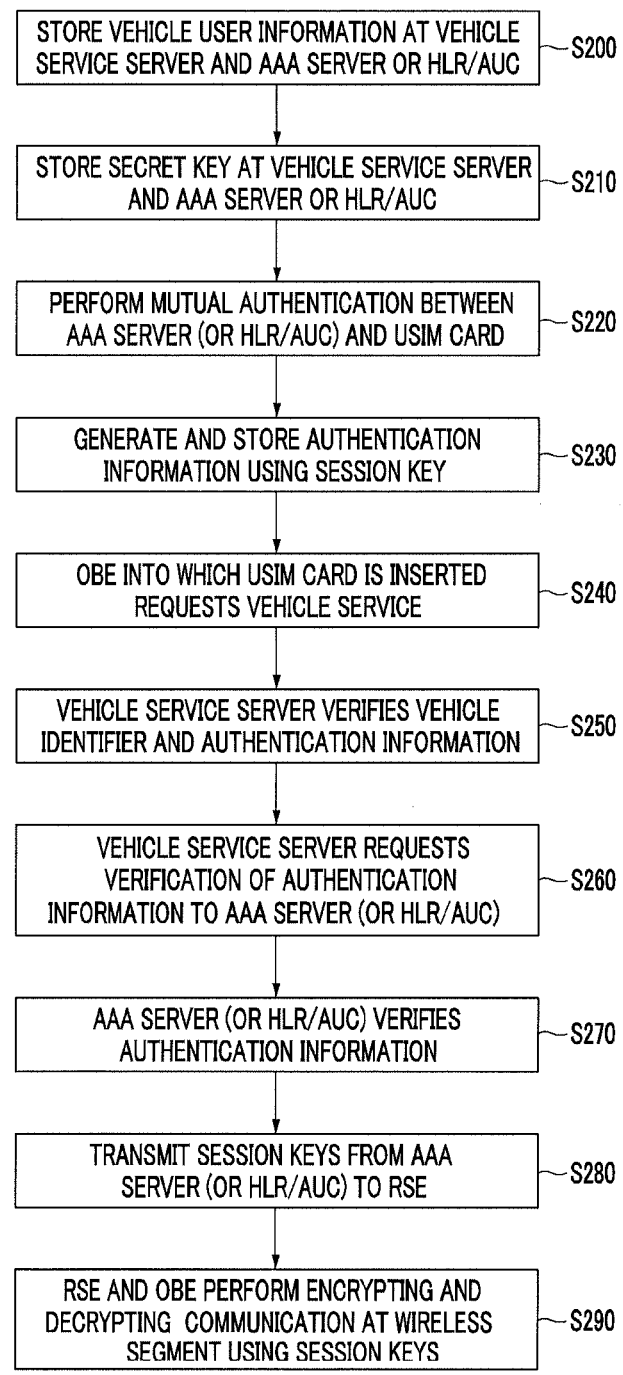
FIG. 2 is a flowchart illustrating a method of performing authentication in a vehicle communication authentication system according to an exemplary embodiment of the present invention.

FIG. 2 is a flowchart illustrating a method of performing authentication in a vehicle communication authentication system according to an exemplary embodiment of the present invention.

Referring to FIG. 2, before performing authentication in a vehicle communication authentication system, the user registers vehicle user information in the AAA server 400 or the HLR/AUC 500 and stores vehicle user information at the USIM card. The vehicle user information is an identifier representing a vehicle user and includes a vehicle identifier, a registration number of a vehicle, and a driving license number of a vehicle user. Alternatively, a separate user registration number that can represent a vehicle user may be issued and used as vehicle user information.

The vehicle service server 300 stores vehicle user information that is registered at the AAA server 400 or the HLR/AUC 500 (S200). That is, the vehicle service server 300 shares and uses vehicle user information that is registered at the AAA server 400 or the HLR/AUC 500 with the AAA server 400 or the HLR/AUC 500.

Further, the user stores a secret key at the AAA server 400 or the HLR/AUC 500 and the USIM card (S210).

The USIM card in which the information is stored is first mounted in the user terminal 600 to perform mutual authentication with the AAA server 400 or the HLR/AUC 500 through an authentication protocol of the wireless network 10 (S220).

The USIM card and the AAA server 400 or the HLR/AUC 500 generate and store authentication information using a session key that is generated in a mutual authentication process, for example, an encryption key and an integrity key (S230). As authentication information, an encrypted value of authentication data in which mutually promised vehicle user information is combined using a key that is generated in a mutual authentication process may be used.

The AAA server 400 or the HLR/AUC 500 stores authentication data by connecting to a vehicle identifier, vehicle user information, and a key that is generated in a mutual authentication process, and when verification of authentication information on vehicle user information is requested later, the AAA server 400 or the HLR/AUC 500 verifies authentication data that are related to the vehicle user information and decrypted authentication information.

When mutual authentication is succeeded in the wireless network 10, the user inserts the USIM card into the OBE 200.

Next, the user executes a vehicle service through vehicle communication. Thereafter, the OBE 200 into which a USIM card is inserted requests a vehicle service to the vehicle service server 300 through the RSE 100 (S240). In this case, authentication information that is generated in the USIM card and a vehicle identifier that requests a vehicle service may be included in a request for the vehicle service.

The vehicle service server 300 that provides a vehicle service receives a request for a vehicle service and verifies a vehicle identifier and authentication information (S250).

The vehicle service server 300 requests verification of authentication information corresponding to a vehicle identifier to the AAA server 400 or the HLR/AUC 500 (S260), and the AAA server 400 or the HLR/AUC 500 searches for authentication information corresponding to a vehicle identifier and verifies whether authentication information is correct through decrypting of the authentication information (S270). That is, the AAA server 400 or the HLR/AUC 500 stores a key, vehicle user information, and authentication data corresponding to a corresponding USIM card that is generated in a mutual authentication process of the wireless network 10.

Therefore, the AAA server 400 or the HLR/AUC 500 verifies whether authentication data corresponding to the stored vehicle identifier corresponds with authentication information that receives a request for verification from the vehicle service server 300, and if authentication data corresponding to the stored vehicle identifier corresponds with authentication information that receives a request for determination from the vehicle service server 300, the AAA server 400 or the HLR/AUC 500 transmits session keys that are generated in a mutual authentication process in the wireless network 10 to the vehicle service server 300.

The vehicle service server 300 transmits session keys that receive from the AAA server 400 or the HLR/AUC 500 to the RSE 100 (S280).

The RSE 100 performs encrypting and decrypting communication with the OBE 200 at a wireless segment using session keys that receive from the vehicle service server 300.

Further, the OBE 200 performs encrypting and decrypting communication with the RSE 100 at a wireless segment using a session key that is stored at the USIM card in a mutual authentication process. In this case, data encrypting and decrypting of the OBE 200 can be performed in the USIM card.

That is, the RSE 100 encrypts vehicle service data using session keys that receive from the vehicle service server 300 and transmits the vehicle service data to the OBE 200. The OBE 200 decrypts the encoded data using session keys that are stored at a USIM card in a mutual authentication process in the wireless network 10. Further, the OBE 200 encrypts various collected data at a wireless segment using session keys that are stored at the USIM card in a mutual authentication process in the wireless network 10 and transmits the various collected data to the RSE 100, and the RSE 100 decrypts corresponding data using session keys that receive from the vehicle service server 300.

Figure 3:
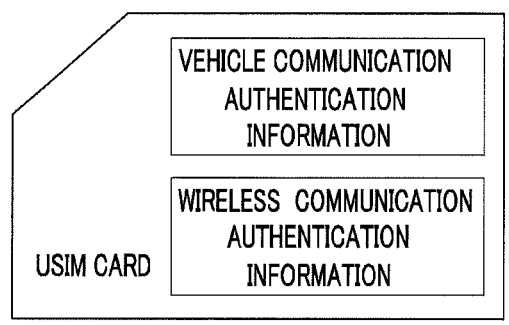
FIG. 3 is a diagram illustrating a USIM card according to an exemplary embodiment of the present invention.

FIG. 3 is a diagram illustrating a USIM card according to an exemplary embodiment of the present invention.

Referring to FIG. 3, wireless communication authentication information that is used for an authentication protocol in a corresponding wireless network and vehicle communication authentication information that is used for authentication in vehicle communication is stored at the USIM card. Vehicle user information may be included in the vehicle communication authentication information.

For example, as wireless communication authentication information that is used for an authentication protocol in a corresponding wireless network, WCDMA authentication information that is used for an AKA authentication protocol in a WCDMA network and/or WLAN authentication information that is used for an EAP-AKA authentication protocol in a WLAN network is stored at the USIM card.

Figure 4:
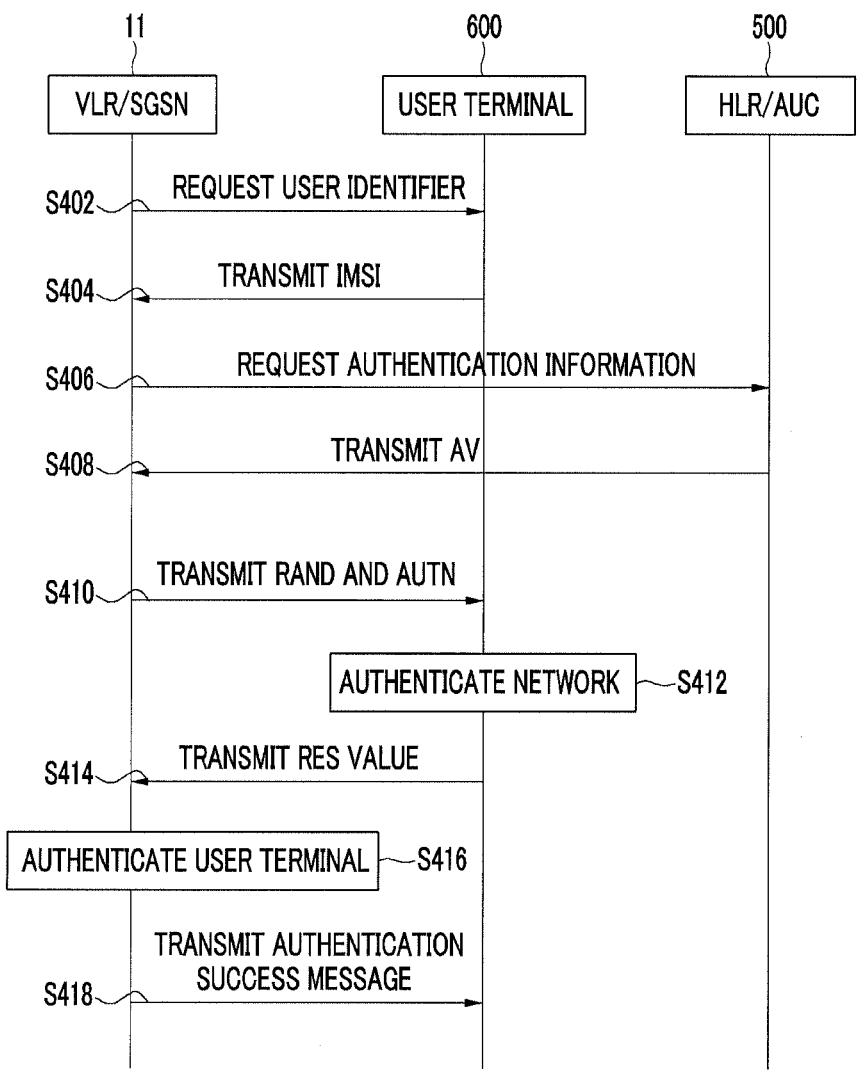
FIG. 4 is a flowchart illustrating an AKA authentication protocol that is applied to the present invention.

FIG. 4 is a flowchart illustrating an AKA authentication protocol that is applied to the present invention.

The AKA authentication protocol can be used in a WCDMA network. The AKA authentication protocol performs mutual authentication between a user and a network using information of a secret key (K) that can use only the USIM card and the HLR/AUC 500.

Referring to FIG. 4, when a visitor location register/serve GPRS supporting node (VLR/SGSN) 11 of the WCDMA network requests a user identifier to the user terminal 600, the AKA authentication protocol is started (S402).

The USIM card of the user terminal 600 transmits an international mobile subscriber identifier (IMSI), which is a user identifier to the VLR/SGSN 11 via a radio network controller (RNC) (not shown), which is a control station (S404).

The VLR/SGSN 11 requests authentication information corresponding to a user identifier to the HLR/AUC 500, which is an authentication server (S406).

The HLR/AUC 500 that receives a request for authentication information corresponding to a user identifier generates a plurality of authentication vectors (AV) and transmits the plurality of AVs to the VLR/SGSN 11 (S408). The HLR/AUC 500 generates a random number (RAND) and a SQuence Nymber (SQN), calculates a message authentication code (MAC), an eXpected RESponse (XRES), an Cipher Key (CK), an Integrity Key (IK), and an authentication token (AUTN) with the RAND, the SQN, and the K, and generates a plurality of AVs using the MAC, the XRES, the CK, the IK, and the AUTN.

The VLR/SGSN 11 transmits one of the RAND and the AUTN of AVs that receive from the HLR/AUC 500 to the user terminal 600 via an RNC (S410).

The USIM card of the user terminal 600 calculates an eXpected MAC (XMAC), a response (RES), a CK, and an IK using the received RAND, AUTN, and K, compares the calculated XMAC and an MAC within the received AUTN, and authenticates a network (S412).

If the XMAC corresponds with the MAC, the user terminal 600 transmits the calculated RES value to the VLR/SGSN 11 via the RNC (S414).

The VLR/SGSN 11 determines whether an RES value that is transmitted by the user terminal 600 corresponds with the calculated XPES value, and if an RES value corresponds with the calculated XPES value, the VLR/SGSN 11 authenticates the user terminal 600 (S416).

If an RES value corresponds with the calculated XPES value, the VLR/SGSN 11 transmits an authentication success message to the user terminal 600 via the RNC (S418), and thus an authentication procedure is successfully terminated.

When an AKA authentication protocol is successfully complete through such a process, the VLR/SGSN 11 transmits a CK and an IK to the RNC.

The RNC stores the CK and the IK that receive from the VLR/SGSN 11 and uses the CK and the IK for encrypting and integrity verification, respectively, in data communication with the user terminal 600.

In the WLAN network, etc., an EAP-AKA authentication protocol can be used as an authentication protocol, and the EAP-AKA authentication protocol can be used to interlock with authentication information of a 3G network. The EAP-AKA authentication protocol is an EAP mechanism using the AKA as an authentication and key distribution protocol and performs an AKA protocol after recognizing a user identifier.

In the EAP-AKA authentication protocol, the AAA server 400 requests generation of an authentication vector to the HLR/AUC 500, and the HLR/AUC 500 generates authentication vectors and transmits the authentication vectors to the AAA server 400. The AAA server 400 performs mutual authentication by performing an AKA authentication protocol with the user terminal 600 and generates and shares a CK and an IK.

In the EAP-AKA authentication protocol, the CK and the IK are not used for data communication, and various keys such as a master key (MK) and a master session key (MSK) are generated using the shared CK and IK. When such key generation is complete, the AAA server 400 transmits the MSK to an access point (AP) or an access control router (ACR), which is a control station and the AP or the ACR stores the MSK. A portion of the MSK that is shared in this way is used as a CK or an IK for encrypting and decrypting of data communication.

According to an exemplary embodiment of the present invention, an authentication method can be provided in communication for vehicles such as DSRC or WAVE using an authentication method of an existing wireless network such as a wide band code division multiple access (WCDMA) or a wireless local area network (WLAN) and can protect data at a wireless segment by generating mutual authentication information and a key through authentication.

Further, because the method of authenticating vehicle communication is interlocked with an authentication server of an existing wireless network, a cost for constructing a separate authentication server for authentication in vehicle communication can be reduced and thus authentication of vehicle communication can be performed with a minimum cost.

An exemplary embodiment of the present invention may be not only embodied through the above-described apparatus and/or method but also embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of performing authentication in an on board equipment that performs vehicle communication with a road side equipment, the method comprising:
    inserting a user subscriber identity module (USIM) card that succeeds in mutual authentication with an authentication subject into a card slot;
    collecting driving information of a vehicle in which the on board equipment is installed and information of peripheral vehicles;
    generating, when requesting a vehicle service, authentication information using session keys that are generated in the mutual authentication and transmitting the authentication information, the driving information of the vehicle, and the information of the peripheral vehicles to a vehicle service server that provides the vehicle service through the road side equipment located on a road side;
    receiving, when the vehicle service server determines success of verification of authentication information in which the on board equipment transmits, encrypted data from the road side equipment; and
    transmitting the driving information of the vehicle and the information of the peripheral vehicles to the road side equipment,
    wherein the authentication information includes an encrypted value of vehicle user information using the session keys, and the vehicle user information includes at least one of a vehicle identifier, a registration number of the vehicle, and a driving license number of a vehicle user.

2. The method of claim 1, further comprising decrypting the encrypted data using the session keys.

3. The method of claim 1, further comprising performing the mutual authentication between a user terminal having a wireless communication module and the authentication subject,
    wherein the USIM card is mounted in the user terminal before the USIM card is inserted into the card slot.

4. The method of claim 3, wherein the performing of the mutual authentication comprises performing an authentication and key agreement (AKA) authentication protocol between the user terminal and the authentication subject.

5. The method of claim 3, wherein the performing of the mutual authentication comprises performing an extensible authentication protocol-authentication and key agreement (EAP-AKA) authentication protocol between the user terminal and the authentication subject.

6. The method of claim 1, wherein vehicle user information to be used for verifying the on board equipment is stored in the USIM card and the authentication subject.

7. A method in which a server that provides a vehicle service authenticates an on board equipment that performs vehicle communication with a road side equipment, the method comprising:
    receiving driving information of a vehicle in which the on board equipment is installed and information of peripheral vehicles;
    receiving a vehicle service request comprising authentication information from the on board equipment that performs vehicle communication with a road side equipment located on a road side and that inserts a USIM card that succeeds in mutual authentication with an authentication subject into a card slot;
    requesting verification on authentication information to the authentication subject;
    receiving, when the authentication subject verifies that authentication information is correct, a session key that is generated in the mutual authentication from the authentication subject;
    encrypting the driving information of the vehicle and the information of the peripheral vehicles using the session key; and
    transmitting the encrypted driving information of the vehicle and the information of the peripheral vehicles to the on board equipment through the road side equipment,
    wherein the authentication information includes an encrypted value of vehicle user information using the session keys, and the vehicle user information includes at least one of a vehicle identifier, a registration number of the vehicle, and a driving license number of a vehicle user.

8. The method of claim 7, wherein the USIM card is inserted into a user terminal having a wireless communication module before the USIM card is inserted into the card slot, and
    the mutual authentication is performed between the user terminal and the authentication subject.

9. The method of claim 7, wherein in the mutual authentication, an AKA authentication protocol or an EAP-AKA authentication protocol is used according to the wireless communication module.

10. The method of claim 7, further comprising storing vehicle user information of the on board equipment,
    wherein the vehicle user information is stored at the authentication subject to be used for verifying whether authentication information is correct.

* * * * *